High-Speed Manchester Code Demodulator

Inventor: Bobby R. Jarrett, Fredericksburg, Va.

Assignee: The United States of America as represented by the Secretary of the Navy, Washington, D.C.

Filed: Apr. 28, 1975

Appl. No.: 573,222

U.S. Cl. ............................ 340/347 DD; 360/42; 307/232; 307/273
Int. Cl.² ..................... H03K 13/00; G11B 5/09
Field of Search ............. 360/42; 307/232, 234, 307/273, 274, 291; 328/109, 111, 112, 119

References Cited

UNITED STATES PATENTS

| | | | |
|---|---|---|---|
| 3,609,569 | 9/1971 | Todd | 307/291 X |
| 3,631,269 | 12/1971 | Monahan | 307/291 X |
| 3,727,202 | 4/1973 | Fort | 360/4 |
| 3,790,821 | 2/1974 | Adamson | 307/273 X |
| 3,829,853 | 8/1974 | Freedman | 340/347 AD |

OTHER PUBLICATIONS

"Fast Monostable Multivibrators Using E.C.L. Gates," Electron, (GB), No. 9, 7/72, pp. 17,18.

*Primary Examiner*—Thomas J. Sloyan

[57] ABSTRACT

A demodulator for decoding the Manchester code is described in which the bit rate is maximized by using a one shot set up for a pulse width less than one-half the bit period. Control of the one-shot is established so that it is clocked at the bit rate but not at twice the bit rate, in order to receive high data rates serially over a single fiber optic channel.

1 Claim, 6 Drawing Figures

HIGH-SPEED MANCHESTER CODE DEMODULATOR

BACKGROUND OF THE INVENTION

Manchester codes (also variously known as biphase and phase modulation) are extensively used in the transmission of digital data. Their chief advantage is their self clocking feature; their chief disadvantage is that the channel must provide a bandwidth slightly in excess of the bit rate. There are two general approaches to decoding Manchester codes: the first is commonly known as an "integrate-and-dump" technique; and the second approach is a sequential operation where non-significant or phase bit transitions are masked in generating a strobe. Generally, the integrate and dump approach requires considerably more hardware.

In the integrate and dump technique, the signal is averaged over the bit period and a decision is then made as to the weight of the bit. A phase-locked-loop is usually used for the bit clock, and, when consecutive "1" or "0" bits are transmitted, the polarity of the received data is normally reversed during the second half of the bit period. The integrate-and-dump technique is considered to be a form of the "matched" or optimal filter approach to detection. In the integration, noise tends to cancel, leaving an integrated signal that is relatively pure.

As the bit frequency increases, it becomes more difficult to "dump" the integrator in a time interval that is insignificant compared to the bit period. Also, the polarity inversion requirement becomes increasingly more difficult to implement, as does the synchronization of the integrator to the bit clock.

In the sequential circuit technique, the usual operation of sequence recognition is extended. The necessity for recognizing the distinction between identical sequences that would give the same output except for a time-of-occurrence restriction ($f$ vs. $2f$ rate) occurs. Thus, the task to be performed required more than counting and decoding.

A common approach today is creating a strobe to use a one-shot with pulse width greater than one-half the bit period which prevents the one-shot from clocking on the non-significant transitions. This technique, however, cannot provide maximum speed due to one-shot recovery time considerations.

SUMMARY OF THE INVENTION

The invention utilizes a one-shot set up for a pulse width that is less than one-half the bit period of the Manchester encoded data.

The Manchester encoded data is fed into a transition marker which detects the zero crossings in the data. The pulses at the output of the transition marker represent both significant and non-significant transitions. In order to isolate the significant transitions from the non-significant transitions, a flip-flop is set up so that it can be clocked at the bit rate but not twice the bit rate. Consequently, the pulse waveform of the output of the flip-flop consists of only significant transitions.

STATEMENT OF THE OBJECTS OF THE INVENTION

An object of this invention is to decode the Manchester code by using a one-shot which is set up so that it can be clocked at the bit rate but not at twice the bit rate in order to mask the "phase" bits or non-significant transitions.

Another object of this invention is to minimize the one-shot duty cycle requirement.

An object of this invention is to provide maximum speed for the logic used, self synchronization and minimum complexity.

Other objects, advantages and novel features of the invention will become apparent from the following detailed description of the invention when considered in conjunction with the accompanying drawings.

DETAILED DESCRIPTION OF THE INVENTION

Figure 1:
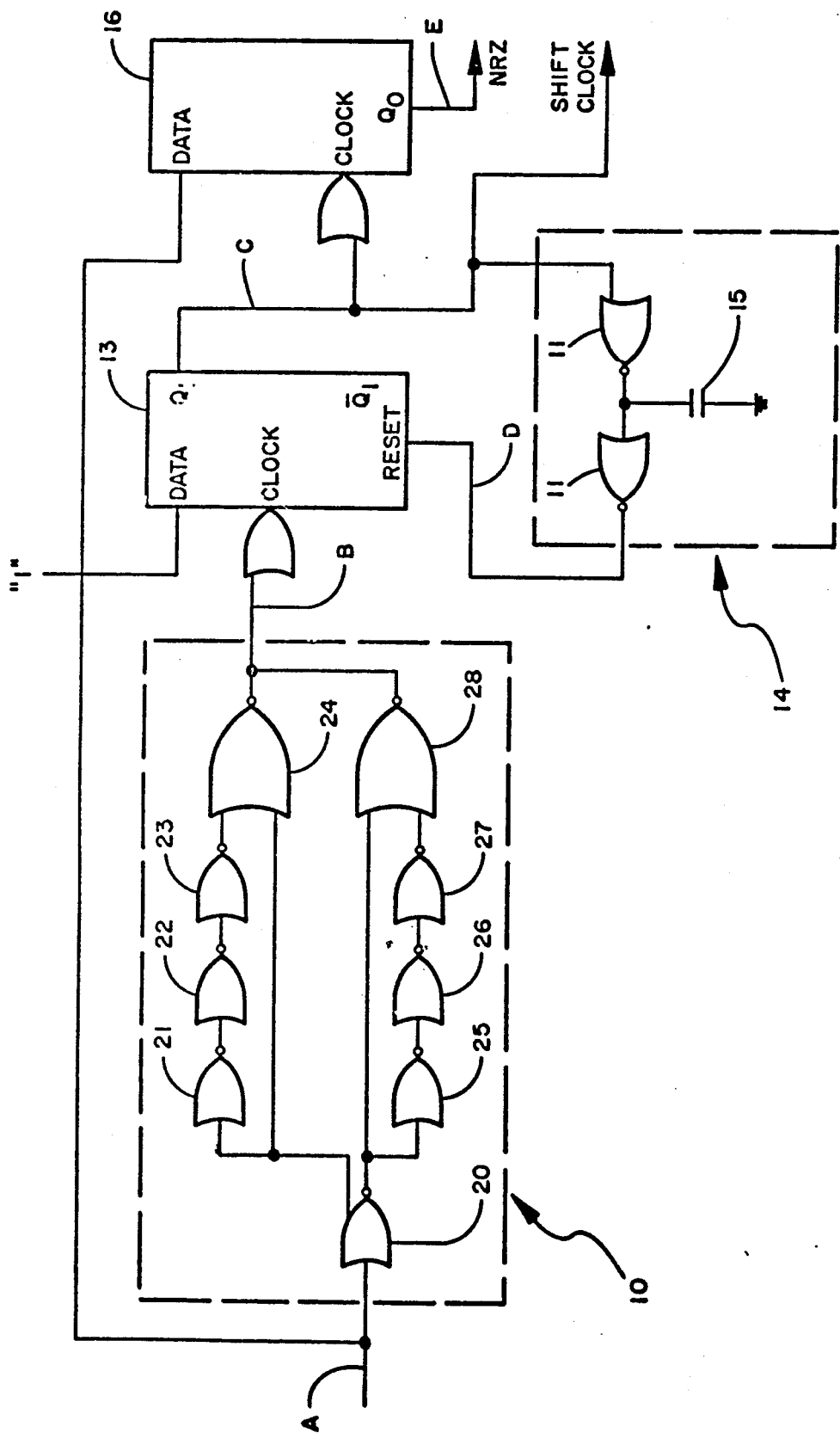
FIG. 1 is a circuit schematic of the demodulator.
Figure 2:
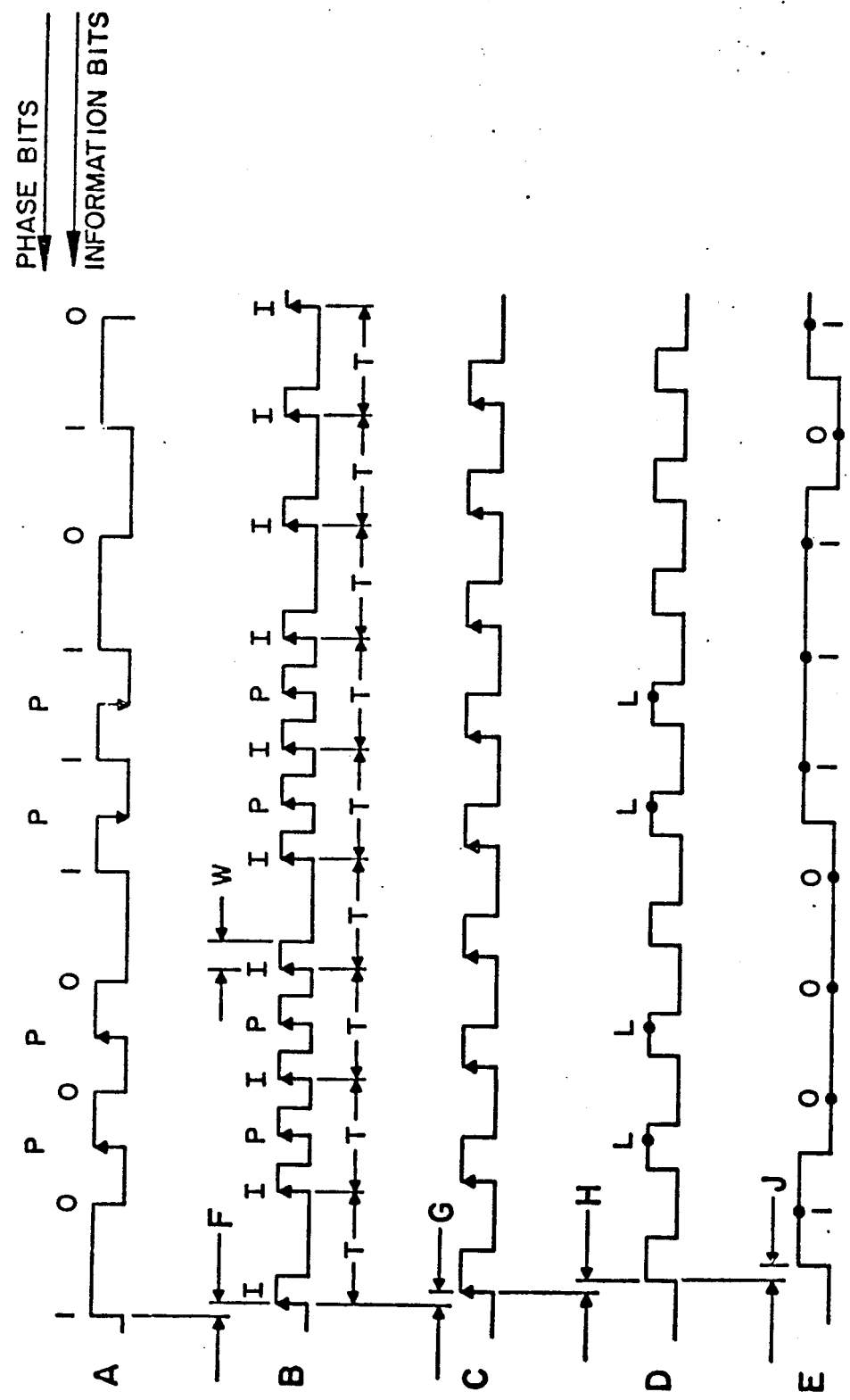
FIG. 2 (A-E) represents typical waveforms appearing at various points in the circuitry of FIG. 1.

FIG. 1 is a circuit schematic of the invention. Information bits of the Manchester coded data A (waveform represented in FIG. 2(A) are at equally spaced intervals, with a transition in one direction representing a binary 1 and a transition in the other direction representing a binary 0. In the event that two bits of the same value are recorded in sequence, an intermediate transition is made. The transition recorded in such an intermediate region is known as a phase bit, and is designated by letter P in FIG. 2(A). The object of the data recovery circuit is to separate the significant (information) transitions from the non-significant (phase) transitions.

The Manchester encoded data A is fed into a transition marker 10 which detects the zero crossings in the data. As shown in FIG. 2(B), the pulses at the output B of the transition marker represent both information and phase bits. In FIG. 2(B), the letter I is indicative of an information bit, the letter P is indicative of a phase bit. The drawing also shows that the time period T separates successive information bits. Assuming the data rate is 48 megabits, the bit period T is equal to the inverse of frequency or 20.8 nanoseconds.

The transition marker 10 shown in FIG. 1, has logic gates 20 through 28. The gates shown are each ¼ of a quad 2-input NOR gate, MC10102 where the propagation delay is about 2.0 nanoseconds. The OR output of gate 20 is an input to gates 21 and 24. The NOR output of gate 21 is an input to gate 22. The NOR output of gate 22 is an input to gate 23. The NOR output of gate 23 is an input to gate 24. The NOR output of gate 20 is an input to gates 25 and 28. The NOR output of gate 25 is an input to gate 26. The NOR output of gate 26 is an input to gate 27. The NOR output of gate 27 is an input to gate 28. The input to the CLOCK of the flip-flop is the wire-ORed outputs of gates 24 and 28. The unused inputs of the gates are considered logic ZERO.

As an example, assume the code at point A of FIG. 1 is logic ONE. The OR output of gate 20 is ONE, the output of gate 21 is ZERO, the output of gate 22 is ONE, the output of gate 23 is ZERO and the output of gate 24 is ZERO. Similarly, the NOR output of gate 20 is ZERO, the output of gate 25 is ONE, the output of gate 26 is ZERO, the output of gate 27 is ONE, and the output of gate 28 is ZERO. Therefore, the input to the CLOCK is logic ZERO. The code at point A changes to logic ZERO. The OR output of gate 20 is ZERO and the NOR output is ONE. Due to the time delay through gates 21 through 23, gate 23 still has an output of ZERO. Gate 24 then has inputs of ZERO and ZERO, therefore a NOR output of ONE. (The propagation delay F of gates 24 and 28 is shown on the waveform in FIG. 2B.) Gate 28 has inputs of ONE and ZERO, therefore a NOR output of ZERO. The CLOCK input is thus ONE. As the signal passes through gates 21 to 23 and gates 25 to 27, gates 24 and 28 then have outputs of ZERO. (This delay determines the width of the pulse W triggered in FIG. 2B.) The CLOCK input is then ZERO.

Similarly, when the code at A changes to ONE, after delay F gate 24 has an output of ZERO while gate 28 has an output of ONE. The CLOCK input is again ONE. After the time W, both gates 24 and 28 have an output of ZERO and the CLOCK input is then ZERO. Thus, the transition marker serves to differentiate the Manchester code waveform.

In order to isolate the information bits from the phase bits, a flip-flop 13 is set up so that it can be clocked at the bit rate but not twice the bit rate. With the use of ECL flip-flops with toggle rates approaching one gigahertz, decoding of bit rates in the gigabit region appears feasible. The flip-flop shown in FIG. 1 is a Type D, Fairchild 9528 having a propagation delay of about 3.5 nanoseconds.

The DATA input of the flip-flop is high (logic ONE) so that the flip-flop can be triggered by the CLOCK unless the flip-flop is in its delay cycle. The detection of the leading edge of each bit by the CLOCK, triggers the flip-flop only when the RESET input is low. The RESET input D locks out the CLOCK input B when the RESET is high. This feature could be implemented in a variety of ways were it not a feature of the flip-flop itself. The maximum clock rate (MCR) of flip-flop 13 is a function of the circuit delays. It is constrained to be: MCR $\leq t_{pd}$ CLOCK + $2t_{pd}$ $Q_1$ − RESET + $t_{pd}$ RESET − $Q_1$ where $t_{pd}$ is the propagation delay and where $Q_1$ is the true side of the flip-flop. The propagation delay through the flip-flop is represented by delay G of FIG. 2(C) while the delay from $Q_1$ to RESET is represented by delay H of FIG. 2(D).

The feedback delay from $Q_1$ to the RESET input is a design choice. There may be none to achieve maximum speed, or it may be provided inherently by the selection of TTL - logic types. A selection from the proper family of low power, regular, high-speed and Schottky versions can provide a choice in propagation delay. If the delay is ideal, the deviation in th code bit rate could be 25% maximum. That is, the bit could be late or early by 25% of its period and not be locked out.

FIG. 1 shows a design choic delay 14 of 2 NOR gates 11 (¼ each of MC10102) where the output of one gate is the input of the other gate and is also fed to the cathode of capacitor 15 while the anode of the capacitor is grounded. The capacitor is used here to provide more delay along with the delay through the gates.

By delaying the RESET input D, the CLOCK input is thus locked out as shown by the dots L on the RESET input waveform, FIG. 2(D). That is, the phase bits are locked out when the RESET is high and $Q_1$ remains low. For information bits, the RESET input D is low, hence the flip-flop can be clocked and the output at $Q_1$ goes high. Consequently, the resulting pulse waveform shown in FIG. 2(C) consists of only the information pulses of FIG. 2(B).

Although in the above description it has been assumed that the pulses at the output of the flip-flop are always of the same polarity and consequently no distinction is made between the two types (0 and 1) of information bits in the waveform of FIG. 2(A), it is understood that each significant zero crossing (FIG. 2(C)) can be used together with the original read-out signal to determine the value of the respective information bit. For example, the output C, along with the original waveform A, is fed into a shift register 16. The output C (FIG. 2(C)) is then used to strobe the Manchester coded waveform for the weight of the bit for NRZ (FIG. 2(E)) representation. The delay J of FIG. 2(E) is the delay through the shift register to the output $Q_0$.

Obviously many modifications and variations of the present invention are possible in the light of the above teachings. It is therefore to be understood that within the scope of the appended claims the invention may be practiced otherwise than is specifically described.

What is claimed is:

1. A demodulator for decoding the Manchester code at bit rates approaching one gigahertz comprising:

a high speed transition marker which receives the Manchester code and generates a pulse representative of the detected zero crossings of both information and phase bits of the Manchester data comprising:

a first NOR logic gate receiving at an input thereof the Manchester code and generating at outputs thereof an OR output and a NOR output; means to delay and invert the NOR output of said first gate;

a second NOR gate receiving at an input thereof the NOR output of said first gate, at another input the delayed and inverted NOR output of said first gate; means to delay and invert the OR output of said first gate;

a third NOR gate receiving at one input the OR output of said first gate and at another input the delayed and inverted OR output of said first gate; and a wire-ORed connection of said outputs of said second and third NOR gates;

a high speed edge triggered flip-flop having a clock input, a reset input which overrides the clock input, an ouput and data inputs wired such that when the output signal of said transition marker is presented to the clock input of the flip-flop, the flip-flop is triggered and the output goes high or stays high unless locked out by the reset;

time delay means connected between said flip-flop ouput and said reset input whereby the flip-flop output pulse width is less than one half the Manchester bit period and is equal to the time of the delay means and the time of the propagation delay from the reset to the output of said flip-flop, and whereby the flip-flop output down time is equal to the time of the delay means and the time of the propagation delay from the reset to the output and the time of the propagation delay from the clock to the output of said flip-flop and the time till the next clock input pulse, and whereby the reset input is held high by the flip-flop output at the point in time corresponding to the occurrence of the phase pulses of the transition marker thereby locking out said phase clock input pulses; and means to strobe the Manchester code input with the output of said flip-flop such that a conversion from Manchester to NRZ is obtained.

* * * * *